April 20, 1926.
W. F. BLEECKER ET AL
1,581,562
DISPLAY APPARATUS
Filed Nov. 24, 1922
2 Sheets-Sheet 1
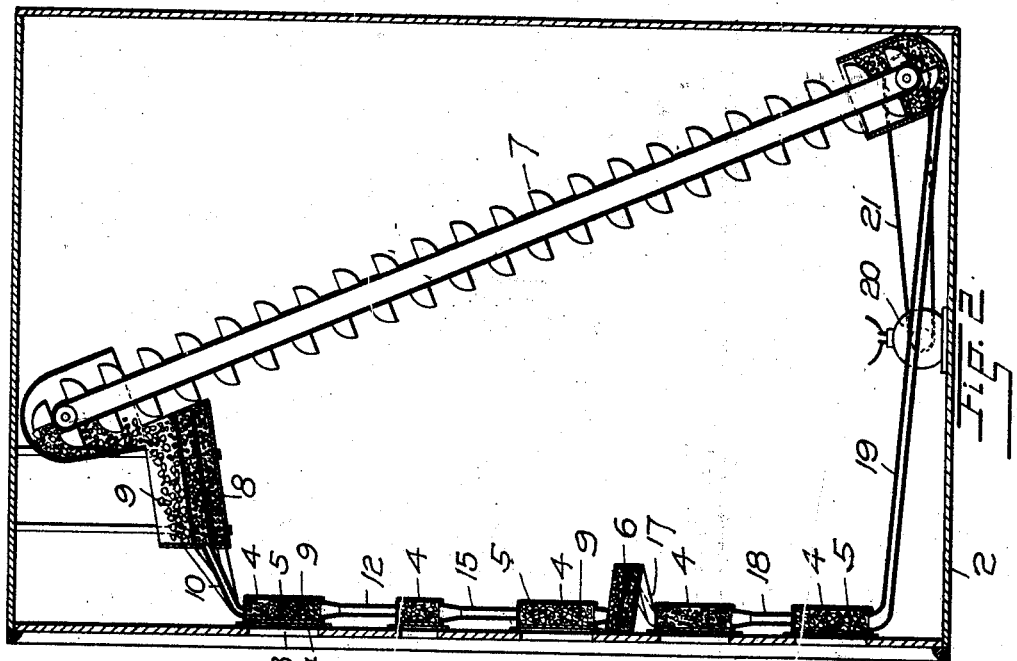
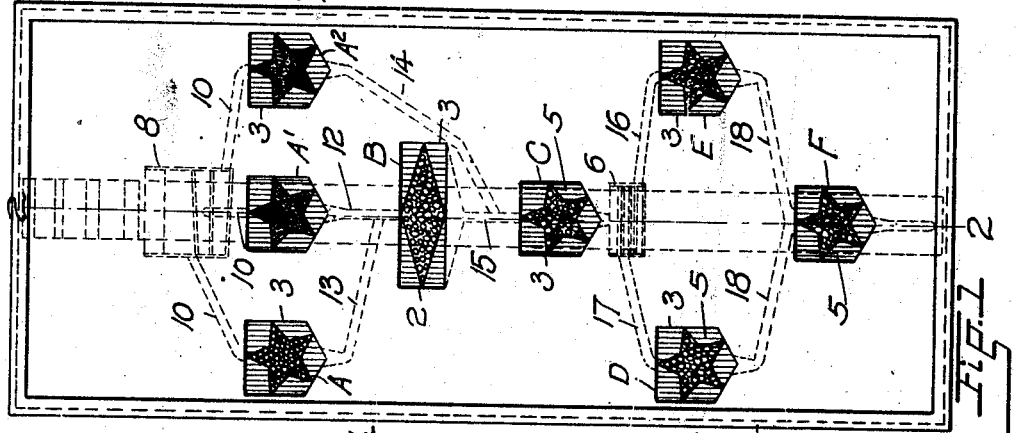
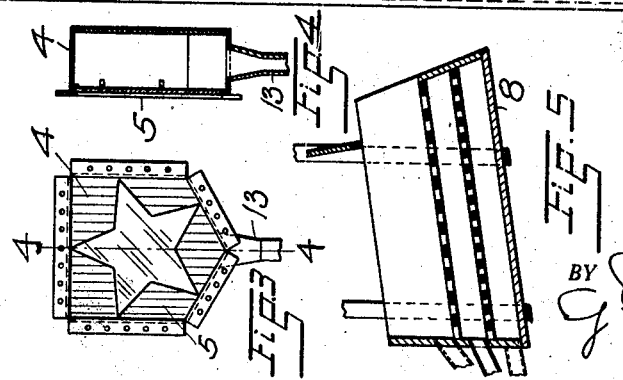
INVENTOR.
W.F. BLEECKER
E.A. CLARK
BY
ATTORNEY.

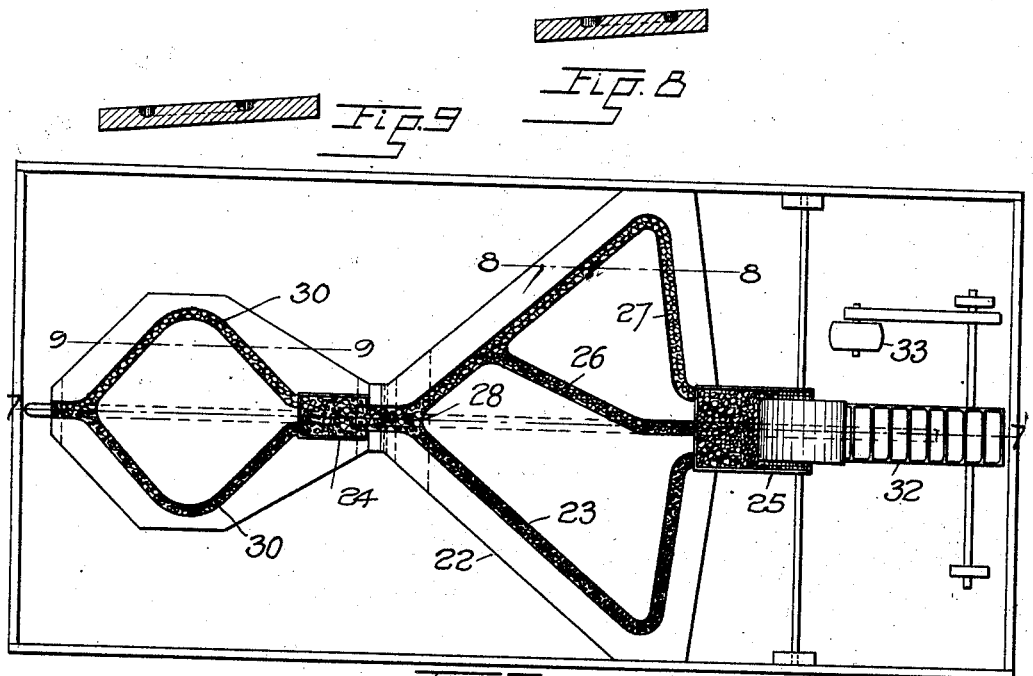
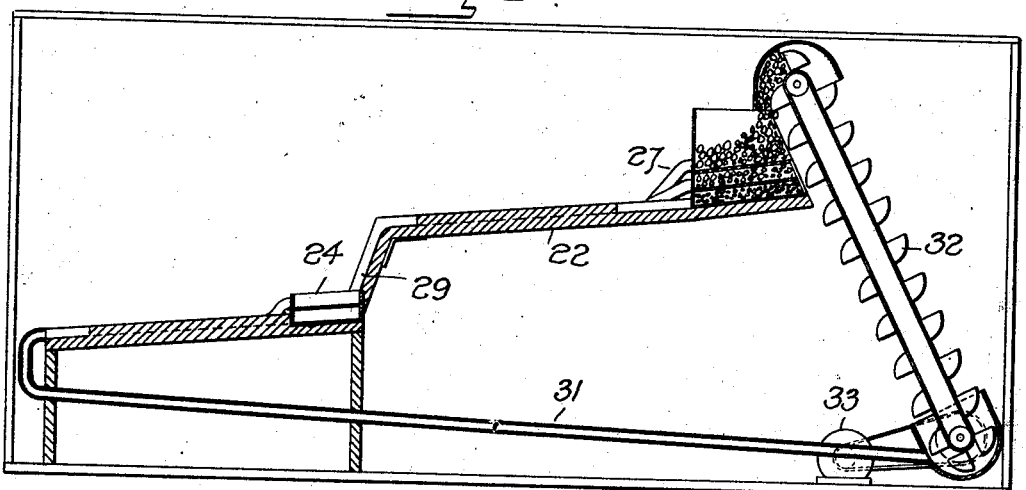

Patented Apr. 20, 1926.

1,581,562

UNITED STATES PATENT OFFICE.

WARREN F. BLEECKER AND ELLSWORTH A. CLARK, OF BOULDER, COLORADO.

DISPLAY APPARATUS.

Application filed May 24, 1922. Serial No. 563,445.

*To all whom it may concern:*

Be it known that we, WARREN F. BLEECKER and ELLSWORTH A. CLARK, citizens of the United States, residing at Boulder, in the county of Boulder and State of Colorado, have invented certain new and useful Improvements in Display Apparatus, of which the following is a specification.

This invention relates to display apparatus adapted particularly for use in connection with signs and window exhibits, and, in general, as an advertising medium, and its principal object is to provide an apparatus of this character which is designed to attract the notice of observers by moving streams of variegated particles.

Another object of the invention is to provide a display apparatus in which streams of moving particles flowing along determinate courses, automatically diversify their colors as they pass from one course to another.

Further objects reside in details of construction and a novel arrangement of parts as will be fully disclosed in the course of the following description with reference to the accompanying drawings which illustrate an embodiment of our invention in two practical applications.

Figures 1 to 5 of the drawings show our invention applied to an advertising sign of arbitrary form and design, and Figures 6 to 9 show its application to a device adapted for use in a window display.

Figure 1 represents a front view of the advertising device to which our invention is applied;

Figure 2, a section on the line 2—2, Figure 1;

Figure 3, a face view of one of the transparent boxes used in connection with the sign;

Figure 4, an enlarged section taken on the line 4—4, Figure 3; and

Figure 5, an enlarged sectional elevation of one of the screen-boxes of the apparatus;

Figure 6 represents a plan view of a window exhibit to which the invention is applied;

Figure 7, a section on the line 7—7, Figure 6; and

Figures 8 and 9, transverse sections taken on the line 8—8 and the line 9—9 of Figure 6, respectively.

The principal element of our invention consists of a mass of granules made in two or more different sizes and correspondingly differing colors, and its operation is based on the principle of producing different hues by blending two or more primary colors in intimate intermixture.

The granules hereinabove referred to, are preferably of spherical form and may be produced of glass by the process disclosed in United States Letters Patent Number 1,175,224 of March 14, 1916.

In carrying our invention into practice, we cause a mass of the assorted granules to pass in a circuitous movement along determinate courses by gravity or otherwise, and separate them according to their sizes by screens or other suitable devices, as they move from one course to another.

The courses may be open to display the moving particles as they pass from one point to another, or the courses may be partially closed and the particles brought to view at separated parts thereof, which can be made in the form of letters, figures or fanciful designs.

When the granules which are of very small size and which, as stated hereinbefore, are dissimilarly colored according to their sizes, are intermixed, the moving mass assumes the hue produced by the combination of their colors, and if they are divided and move in separate courses, each stream will have the color of the particles of which it is composed.

The separation of the colors at the ends of the courses is preferably accomplished by series of screens through or along which the particles pass according to their sizes, and after the moving mass or masses have reached the termini of their courses, they are returned to the starting point thereof through the medium of an elevating conveyor or other suitable contrivance.

It will be understood from the above that our invention is capable of many widely varying applications for different purposes and that the constructions shown in the drawings are merely illustrative of methods for carrying the invention into effect, which at present appear to be most practical, useful and desirable.

Referring first to Figures 1 to 5 of the drawings, the reference character 2 designates an upright signboard which in its face, has a number of symmetrically arranged openings 3 for the display of transparent boxes 4.

The boxes may be made in the form of letters, words, or arbitrary or symbolic designs, according to the nature of the apparatus. They are closed at their fronts by windows 5 made of glass or other transparent material through which the moving granules may be seen, and these windows may show the designs by shields or coatings of opaque material as in the form shown in the drawings.

The boxes are connected back of the board by conduits through which the masses of particles pass from one to another, and at points at which it is desired to separate the granules according to their sizes, screens are placed, as indicated at 6.

After the mass of particles has passed through the last and lowermost box of the series, it is elevated by an endless bucket-conveyor 7 to a point of discharge above a screening-appliance 8 placed at an elevation above that of the first or uppermost box or boxes of the sign.

The screens have been shown in the drawings as composed of two perforated plates of different meshes respectively corresponding with two sizes of the granules exclusive of the largest size, and arranged slantingly and in superposed relation in a box which may be stationary as in the form shown in the drawings, or which may be vibrated by any suitable means should its movement be required to effect or expedite the separation of the sizes.

In the illustrations, granules 9 of three different sizes and correspondingly differing colors, are fed into a row of three boxes A, A' and A² at the upper end of the sign from the screen box 8 with which they are connected by conduits 10.

The middle box of the row connects by means of a conduit 12 with a box B at a lower elevation which in turn discharges its contents into a subjacent box C.

The box A of the upper series is connected by means of a conduit 13 with the conduit 12 between the boxes A² and B, and the third box A³ of the series is by a conduit 14 connected with the conduit 15 between the boxes B and C.

The screen box 6 placed beneath the box C in communication with an opening in the bottom thereof, separates one of the sizes from the others, to be conducted through a conduit 17 to a box D, while the two other sizes are together conducted to a box E by a conduit 16.

The contents of the two boxes last mentioned, are finally conducted through conduits 18 to a box F at the lower end of the sign, from where the three sizes, once more intermixed, are discharged through a conduit 19 into the boot of the slanting elevator 7 which carries the particles back to the screen box in which they are divided as before.

It will thus be seen that if for example, the three sizes of particles in the boxes A, A' and A² are colored red, green and blue, the hue of the intermixed particles in the box B will be brown, that of the mixture in the box C containing all three sizes, a neutral shade varying in accordance with the proportionate quantities of the particles, the two colors conducted to the box E will present a blue-green appearance, while the one size in the box D is red, and after the three sizes have again been intermixed in the lower box F, their mixture will have a neutral hue as before.

It will be evident that a large number of variations may be made in this matter and that variegated signs of many different forms and constructions may be produced by the use of our invention.

The conveyor 7 may be operated by an electric motor 20 with which it is connected through the medium of a belt 21.

The construction shown in Figures 6 to 8 of the drawings, differs from that hereinbefore described in that the particles are exposed to view while flowing from one point to another.

This form of the invention is particularly adapted for use in window displays and it may be arranged to simulate streams, water falls and lakes in a model representing mountain scenery, or other landscape.

In the drawings, the reference numeral 22 designates a suitable support for a system of slanting open channels and an interposed screen box.

A screen box 25 at the head end of the support divides the particles, colored as before according to their sizes, into three classes which are separately discharged into three open channels 23, 26 and 27, one of which merges into another and the others of which meet at a point 28, and continue together at a greater angle through a steeply inclined channel 29 which discharges onto the upper member of a second screen box 24.

In this box the particles of larger size are separated from the two others and the two classes thus obtained enter into curved channels 30 which meet at a point at the lower end of the support to re-unite the three sizes which in intermixture, are moved by gravity through a chute 31 to the boot of an inclined elevator 32 which returns them to the screen box. The elevator is operated by a motor 33 as before.

Presuming that the channels are arranged to simulate the water courses of a mountain scene and the mass of granules used in the device are made in three different sizes and correspondingly different colors, as for example, red, blue and green, the three channels diverging from the screen box at the upper end of the support, will show flowing streams of matter in the different colors, to the point at which the channels 26 and 27 are joined together, from which point the stream will have the hue obtained by blending of the colors.

After the three colors are intermixed at the point at which the channels 23 and 27 are united, the stream flowing through the steeply inclined channel 29, provided to simulate a waterfall, will have the tint obtained by mixing the three colors and the streams originated at the foot of the fall will have respectively the color of the largest granules and the hue obtained by mixing the other two sizes.

As in the first described form of the invention, the construction shown in Figures 6 and 7 is capable of many variations.

It will be understood that although the best effects are obtained by the use of granules of different sizes and correspondingly differing colors, an attractive sign or other display apparatus may be produced by causing granules of one size and of one or more colors to move through a completely or partially exposed channel in simulation of a flowing stream, and feeding said granules into said channel at an entrance thereof, in a circuitous movement.

What we claim and desire to secure by Letters Patent is:

1. In display apparatus, the combination with an element having a system of intercommunicating channels between separated points of feed and discharge, the channels being exposed at a surface of the element, of a quantity of granules of different sizes and correspondingly differing colors adapted to move through the channels, means in the system for dividing the granules according to their sizes, and a conveyor for returning the granules from the point of discharge of the system to the feed point of the same.

2. Display apparatus comprising a body having a display face, runways adapted for the exposed flow of currents of granules at said face of the apparatus, and meeting one another for the intermixture of said currents, and quantities of granules of different sizes and correspondingly differing colors in the runways.

3. Display apparatus comprising a body having a display face, runways adapted for the exposed flow of currents of granules at said face of the apparatus, a plurality of said runways discharging into another lower runway for the intermixture of their currents, and quantities of granules of different sizes and correspondingly differing colors in the runways.

4. Display apparatus comprising runways adapted for the exposed flow of currents of granules, a plurality of said runways discharging into another lower runway for the intermixture of their currents, quantities of granules or different sizes and correspondingly differing colors in the runways and a sizing appliance for the granules disposed to discharge its sizes into the upper runways.

5. Display apparatus comprising runways adapted for the exposed flow of currents of granules, a plurality of said runways discharging into another lower runway for the intermixture of their currents, quantities of granules of different sizes and correspondingly differing colors in the runways, a sizing appliance and means for conveying the granules discharged from the lower runway to the sizing appliance.

6. Display apparatus comprising a body having a display face, a sizing appliance, a runway feeding into said appliance, and runways receiving the sizes delivered from the appliance, said runways being adapted for the exposed flow of currents of granules at said face of the body, and quantities of granules of different sizes and correspondingly differing colors in the runways.

7. Display apparatus comprising a sizing appliance, runways receiving the sizes delivered from the appliance and having a common outlet, the runways being adapted for the exposed flow of currents of granules, and quantities of granules of different sizes and correspondingly differing colors in the runways.

8. Display apparatus comprising a sizing appliance, runways receiving the sizes delivered from the appliance and having a common outlet, the runways being adapted for the exposed flow of currents of granules, quantities of granules of different sizes and correspondingly differing colors in the runways, and means to convey the granules from said oulet to the sizing appliance.

In testimony whereof we have affixed our signatures.

WARREN F. BLEECKER.
ELLSWORTH A. CLARK.